US009064171B2

(12) United States Patent
Matsukawa

(10) Patent No.: US 9,064,171 B2
(45) Date of Patent: Jun. 23, 2015

(54) DETECTION DEVICE AND METHOD FOR TRANSITION AREA IN SPACE

(75) Inventor: Takayuki Matsukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 13/811,796

(22) PCT Filed: Jul. 14, 2011

(86) PCT No.: PCT/JP2011/004029
§ 371 (c)(1),
(2), (4) Date: Jan. 23, 2013

(87) PCT Pub. No.: WO2012/014403
PCT Pub. Date: Feb. 2, 2012

(65) Prior Publication Data
US 2013/0121535 A1   May 16, 2013

(30) Foreign Application Priority Data

Jul. 30, 2010   (JP) ................................. 2010-172379

(51) Int. Cl.
*G06K 9/32* (2006.01)
*G06T 7/20* (2006.01)
(Continued)

(52) U.S. Cl.
CPC ............ *G06K 9/3233* (2013.01); *G06T 7/2033* (2013.01); *G06T 2207/30232* (2013.01); *G06K 9/4671* (2013.01); *G06K 9/6211* (2013.01)

(58) Field of Classification Search
None
See application file for complete search history.

(56) References Cited

U.S. PATENT DOCUMENTS

| 6,453,069 B1* | 9/2002 | Matsugu et al. .............. 382/173 |
| 6,766,055 B2* | 7/2004 | Matsugu et al. .............. 382/173 |
| 7,082,209 B2 | 7/2006 | Ito et al. |

(Continued)

FOREIGN PATENT DOCUMENTS

| CN | 101197045 | 6/2008 |
| CN | 101281537 | 10/2008 |

(Continued)

OTHER PUBLICATIONS

David G. Lowe, "Distinctive Image Features from Scale-Invariant Keypoints", International Journal of Computer Vision, vol. 60, No. 2, 2004, pp. 91-110.

(Continued)

*Primary Examiner* — Tsung-Yin Tsai
(74) *Attorney, Agent, or Firm* — Greenblum & Bernstein, P.L.C.

(57) ABSTRACT

Provided is a transition area detection device capable of detecting, with high precision, a transition area in a space without using a positioning sensor. The transition area detection device has a corresponding point search-use feature point selection unit for selecting feature points used for determining a reference image from among feature points of an input image (captured image), a geometric transformation parameter calculation-use feature point selection unit for selecting feature points used for calculating geometric transformation parameters from among feature points of the input image and feature points of the reference image, and a degree of similarity calculation-use feature point selection unit; for selecting feature points used for obtaining a degree of similarity between the captured image and the reference image from among the feature points of the input image and the feature points of the reference image.

4 Claims, 8 Drawing Sheets

(51) Int. Cl.
*G06K 9/46* (2006.01)
*G06K 9/62* (2006.01)

(56) References Cited

U.S. PATENT DOCUMENTS

| | | | |
|---|---|---|---|
| 7,200,270 B2* | 4/2007 | Yamaguchi | 382/224 |
| 7,627,178 B2* | 12/2009 | Suzuki et al. | 382/190 |
| 7,660,465 B2* | 2/2010 | Yamaguchi | 382/181 |
| 8,311,368 B2 | 11/2012 | Magai et al. | |
| 8,374,437 B2* | 2/2013 | Nakamura et al. | 382/201 |
| 2002/0041698 A1 | 4/2002 | Ito et al. | |
| 2003/0128876 A1 | 7/2003 | Yamaguchi | |
| 2004/0103101 A1* | 5/2004 | Stubler et al. | 707/100 |
| 2006/0204079 A1* | 9/2006 | Yamaguchi | 382/154 |
| 2008/0013836 A1* | 1/2008 | Nakamura et al. | 382/209 |
| 2008/0069450 A1* | 3/2008 | Minami et al. | 382/199 |
| 2008/0247675 A1 | 10/2008 | Magai et al. | |
| 2009/0041340 A1* | 2/2009 | Suzuki et al. | 382/159 |
| 2009/0092336 A1* | 4/2009 | Tsurumi | 382/294 |
| 2009/0103814 A1* | 4/2009 | Nakamura et al. | 382/201 |
| 2009/0141984 A1 | 6/2009 | Nakamura et al. | |
| 2011/0170784 A1 | 7/2011 | Tanaka et al. | |

FOREIGN PATENT DOCUMENTS

| | | |
|---|---|---|
| CN | 101425144 | 5/2009 |
| EP | 1998139 | 12/2008 |
| JP | 2002-158999 | 5/2002 |
| JP | 2003-242509 | 8/2003 |
| JP | 2008-257469 | 10/2008 |
| JP | 2009-116385 | 5/2009 |
| JP | 2010-134548 | 6/2010 |

OTHER PUBLICATIONS

Norio Katayama et al., "The SR-tree: An Index Structure for High-Dimensional Nearest Neighbor Queries", Proceedings of the 1997 ACM SIGMOD International Conference on Management of Data, May 1997, pp. 369-380.
Search Report in Chinese Patent Application No. 201180037616.0, mail date is Nov. 25, 2014 (English Translation).

* cited by examiner

| REGISTERED IMAGE ID | CHARACTERISTIC POINT ID | COORDINATES | CHARACTERISTIC VALUE |
|---|---|---|---|
| 1 | 1 | $x^{(1)}_1, y^{(1)}_1$ | $v^{(1)}_{11}, v^{(1)}_{12}, \cdots, v^{(1)}_{1n}$ |
| 1 | 2 | $x^{(1)}_2, y^{(1)}_2$ | $v^{(1)}_{21}, v^{(1)}_{22}, \cdots, v^{(1)}_{2n}$ |
| : | : | : | : |
| 2 | $N_f+1$ | $x^{(2)}_1, y^{(2)}_1$ | $v^{(2)}_{11}, v^{(2)}_{12}, \cdots, v^{(2)}_{1n}$ |
| : | : | : | : |

FIG.4

INPUT IMAGE

REGISTERED IMAGE (REFERENCE IMAGE)

CHARACTERISTIC POINT

CHARACTERISTIC POINT WITH LARGE DISTANCE
BETWEEN CHARACTERISTIC VALUES

VARIED (ABNORMAL) REGION

DETECTION DEVICE AND METHOD FOR TRANSITION AREA IN SPACE

TECHNICAL FIELD

The present invention relates to an apparatus and a method that detect a varied region in a space on the basis of a captured image acquired by a portable camera.

BACKGROUND ART

Recently, systems that perform monitoring with wearable cameras or similar devices have been put to practical use. One of such systems detects items that are taken away or left behind on the basis of images from a wearable camera worn by a security guard. An item that is taken away (for example, stolen) is detected by identifying an item that appears in registered images but does not appear in the captured image. On the other hand, an item that is left behind (for example, planting a dangerous item, such as a bomb) is detected by identifying an item that does not appear in the registered images but appears in the captured image.

An image captured by a wearable camera varies depending on the position, orientation, and other parameters of the camera. Thus, information on the captured space (positioning information) is required. That is, a wearable camera includes sensors, such as a GPS, a gyro-sensor, and a magnetic direction sensor, which acquire positioning information serving as attribute information of a captured image. Then, an image corresponding to the positioning information is selected from the registered images (hereinafter, this image is referred to as "reference image"). In other words, a reference image capturing the same space as that in the captured image is identified by the positioning information. A comparison of the reference image and the captured image allows a varied region to be detected in the space. Based on such detection, an item taken away or left behind is identified as described above.

To detect a varied region in a space with an image captured by a portable camera and a reference image, the captured image and the reference image must first be aligned. In other words, a reference image that corresponds to the captured image must be selected.

There are two possible approaches of alignment:

An approach using sensors, such as a GPS, as mentioned above; and

An approach involving image processing such as pattern matching of images.

A technique of alignment by image processing is described in, for example, Patent Document 1.

CITATION LIST

Patent Literature

PTL 1
Japanese Patent Application Laid-Open No. 2003-242509

Non-Patent Literature

NPL 1
D. Lowe, "Distinctive Image Features from Scale-Invariant Keypoints", International Journal of Computer Vision, Vol. 60, No. 2, pp. 91-110, 2004

NPL 2
N. Katayama and S. Satoh, "The SR-tree: An Index Structure for High-Dimensional Nearest Neighbor Queries", Proceedings of the 1997 ACM SIGMOD International Conference on Management of Data, pp. 369-380, 1997

SUMMARY OF INVENTION

Technical Problem

The technique described in PTL 1 originally does not presume selection of a reference image capturing the same space as that in a captured image under the assumption that the captured image includes a region that has varied from the corresponding region in the reference image. That is, conventional image processing represented by PTL 1 does not take account of a partial difference between a captured image and a reference image. Thus, a reference image capturing the same space as that in a captured image might not appropriately be selected through pattern matching. With the technique described in PTL 1, pattern matching is performed on local characteristics. Thus, the pattern matching is likely to be affected by the varied region in the captured image, and as a result, an inappropriate reference image is more likely to be selected. That is, the result of pattern matching of local characteristics is affected by items that appear in the captured image but do not appear in the reference image or, otherwise, by items that appear in the reference image but do not appear in the captured image. This is not preferred for the selection of a reference image capturing the same space.

If an appropriate reference image is not selected (i.e., if a reference image capturing the same space as that in the capture image is not selected), the accuracy of detection of a varied region decreases obviously.

Positioning sensors, such as a GPS, have a disadvantage in that they are only operable in limited locations. GPSs can only be used outdoors. A possible way for positioning other than GPS is UWB, which requires a receiver installed inside the facility, causing the system to be complicated. In either case, alignment of a captured image and a reference image by sensors has a disadvantage in that it can only be performed in limited locations and/or requires a complicated structure in addition to a camera, compared with alignment performed by image processing.

An object of the present invention is to provide a detecting apparatus and a method that accurately detect a varied region in a space, without positioning sensors.

Solution to Problem

An aspect of the varied-region detecting apparatus according to the present invention includes: a characteristic-point detecting section that detects characteristic points in a captured image; a registered-image database that stores a plurality of registered images; a first characteristic-point selecting section that selects characteristic points to be used for determination of a reference image from the characteristic points in the captured image; a reference-image determining section that matches the captured image to every registered image based on the characteristic points selected by the first characteristic-point selecting section and characteristic points in the registered images stored in the registered-image database and determines a registered image having the highest matching with the captured image as a reference image among the registered images; a second characteristic-point selecting section that selects characteristic points to be used for calculation of a geometric transformation parameter from the characteristic points in the captured image and characteristic points in the reference image; a geometric-transformation-parameter calculating section that calculates the geometric transformation parameter based on the characteristic points selected by the second characteristic-point selecting section; a third characteristic-point selecting section that selects characteristic points to be used for determination of a similarity between the captured image and the reference image from the characteristic points in the captured image and the characteristic points in the reference image; a similarity calculating section that geometrically transforms the characteristic points selected by the third characteristic-point selecting section using the geometric transformation parameter calculated by the geometric-transformation-parameter calculating section and calculates the similarity between the characteristic points in the captured image and the characteristic points in the reference image, after the geometric transformation; and a varied-region identifying section that identifies a varied region based on the similarity determined by the similarity calculating section.

An aspect of the method according to the present invention of detecting a varied region calculates a similarity between a captured image and a reference image and detects a varied region in the captured image based on the similarity, the method including: a first characteristic-point selection step of selecting characteristic points to be used for determination of the reference image from characteristic points in the captured image; a second characteristic-point selection step of selecting characteristic points to be used for calculation of a geometric transformation parameter from the characteristic points in the captured image and the characteristic points in the reference image; and a third characteristic-point selection step of selecting characteristic points to be used for determination of the similarity between the captured image and the reference image from the characteristic points in the captured image and the characteristic points in the reference image.

Advantageous Effects of Invention

The present invention enables independent selection of characteristic points suitable for determining a reference image, characteristic points suitable for calculating a geometric transformation parameter, and characteristic points suitable for calculating similarity, thus enabling determination of an appropriate reference image, an appropriate geometric transformation parameter, and accurate similarity, without excess calculation. As a result, a varied region can be precisely determined with a reduced calculation load.

BRIEF DESCRIPTION OF DRAWINGS

FIG. 4 illustrates information stored in a registered-image database;

DESCRIPTION OF EMBODIMENTS

Now, embodiments of the present invention will be described in detail with reference to the drawings.

Figure 1:
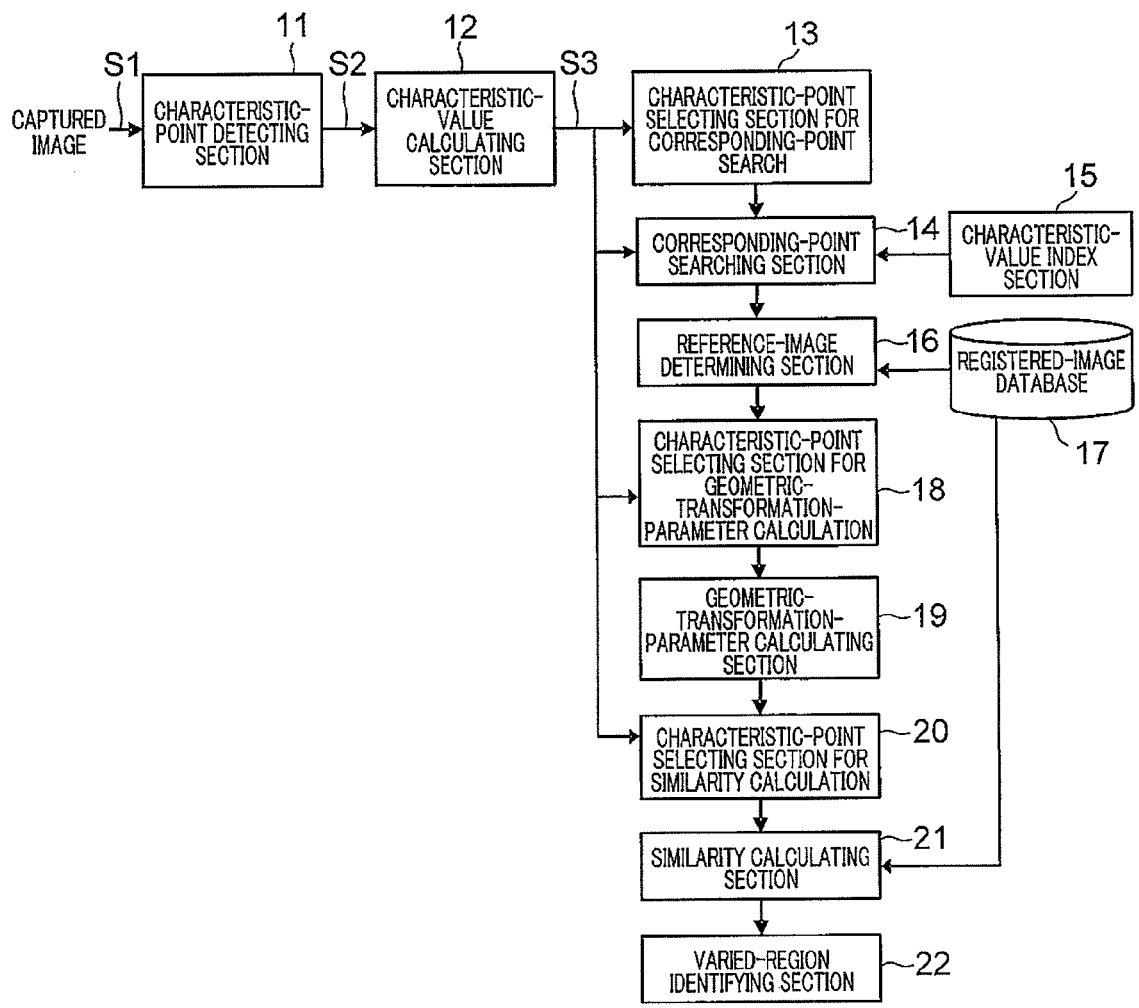
FIG. 1 is a block diagram of the configuration of a varied-region detecting apparatus according to an embodiment of the present invention.

FIG. 1 illustrates the configuration of a varied-region detecting apparatus according to an embodiment of the present invention. Varied-region detecting apparatus 10 inputs captured image S1 to characteristic-point detecting section 11. Captured image S1 is acquired by a portable camera, such as a wearable camera.

Characteristic-point detecting section 11 detects characteristic points in captured image S1. A characteristic point may be detected as a point corresponding to an extremum of multiple Difference-of-Gaussian (DOG) images generated from the difference in different smoothened images, such as those used in scale-invariant feature transform (SIFT). Characteristic-point extraction by DOG is a known technique described in, for example, NPL 1, and thus, a description thereof is omitted. Characteristic-point detecting section 11 detects multiple characteristic points in one captured image. The detected characteristic-point information S2 is sent to characteristic-value calculating section 12.

Characteristic-value calculating section 12 calculates and outputs characteristic values S3 for the characteristic points detected by characteristic-point detecting section 11. The calculated characteristic values are preferably characteristic values that have constant rotation and scale, such as those used in SIFT. In this embodiment, the characteristic values are gradient information (multidimensional vector information) in the vicinity of the characteristic points.

Characteristic-point selecting section 13 for corresponding-point search selects characteristic points to be used by corresponding-point searching section 14 from the characteristic points detected by characteristic-point detecting section 11. Specifically, characteristic-point selecting section for corresponding-point search selects only sparse characteristic points in the space of characteristic values calculated by characteristic-value calculating section 12 from the characteristic points detected by characteristic-point detecting section 11. Sparse characteristic points have no other characteristic points in their neighbors. In other words, the sparse characteristic points selected by characteristic-point selecting section 13 for corresponding-point search are sparser than the characteristic points selected by characteristic-point selecting section 20 for similarity calculation, which will be described below.

Selection of such sparse characteristic points allows selection of an appropriate reference image even when an item newly appears or disappears in an input image (captured image). That is, selection of sparse characteristic points reduces the effect of local variation in the input image. As a result, the possibility of selection of an inappropriate reference image decreases.

Corresponding-point searching section 14 searches the registered images for characteristic points (corresponding points) at which a distance between characteristic values with respect to each of the Nf characteristic points in the input image is smaller than or equal to a threshold. The distance between characteristic values refer to Euclidean distance. In this embodiment, the registered images are not directly used, but instead, corresponding points are searched for on the basis of characteristic-value indices stored in a characteristic-value index section. In this way, the search of corresponding points can be more efficient than direct use of the registered images.

Characteristic-value index section 15 stores the characteristic values of all characteristic points contained in the registered images stored in registered-image database 17. Characteristic-value index section 15 has an index structure, such as an SR-tree, that enhances the search efficiency of corresponding points. The SR-tree is a known technique described in, for example, PTL 2, and thus, a description thereof is omitted.

Figures 2A, 2B:
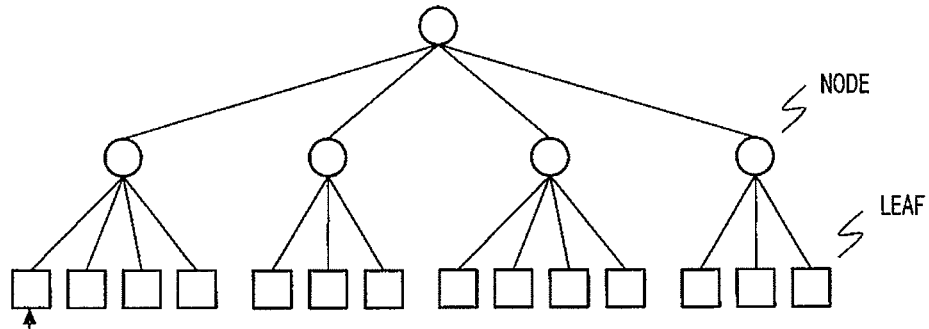
FIG. 2A illustrates the tree structure of an SR-tree.
FIG. 2B illustrates the data structure of a leaf.

FIG. 2A illustrates the structure of an SR-tree, and FIG. 2B illustrates the data structure of a leaf. As illustrated in FIG. 2B, each entry of a leaf of the SR-tree stores, in addition to the characteristic values, the identification numbers (IDs) of the original registered images containing the characteristic values.

Figure 3:
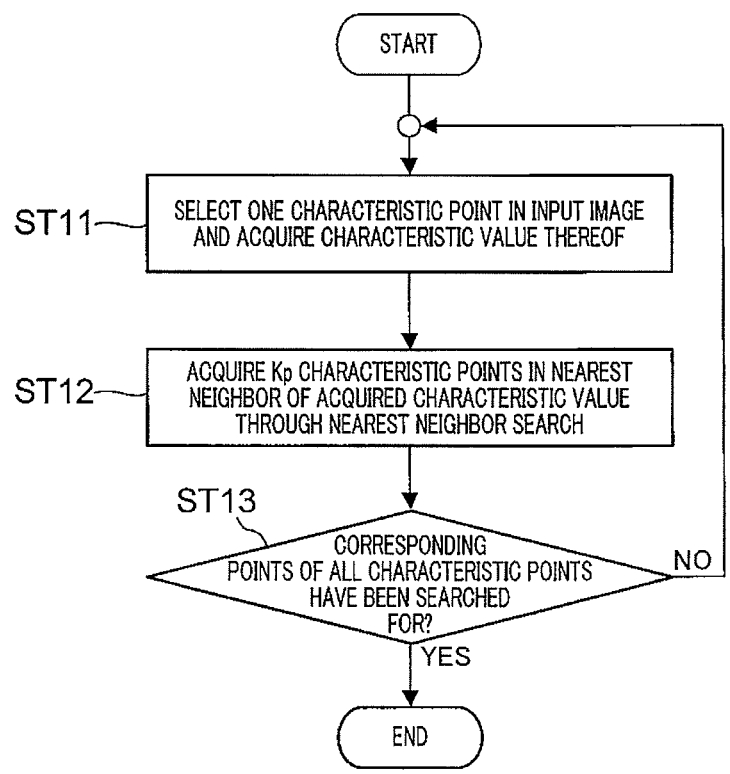
FIG. 3 is flow chart of the procedures carried out by a corresponding-point searching section.

FIG. 3 illustrates the procedures performed by corresponding-point searching section 14. For each characteristic point in a captured image, corresponding-point searching section 14 searches the registered images for a plurality of corresponding points. For example, a p-th characteristic point in the captured image has Kp corresponding points in the registered images. In Step ST11, corresponding-point searching section 14 selects one characteristic point in the input image (reference image) and acquires the corresponding characteristic value. Step ST12 acquires, through a nearest neighbor search, Kp characteristic points nearest to the characteristic value acquired in Step ST11 as corresponding points in the registered images. Step ST13 determines whether corresponding points for all characteristic points in the input image (captured image) have been searched for. If the result is negative in Step ST13 (NO in Step ST), a search of the corresponding points for the next characteristic point is performed by repeating Steps ST11 and ST12 until the result is positive in Step ST13 (YES in Step ST), and the search of corresponding points ends.

In this embodiment, characteristic-value index section 15 is provided. Alternatively, the registered images may be directly searched for corresponding points.

Reference-image determining section 16 casts one vote for each original registered image containing a corresponding point searched by corresponding-point searching section 14 on the basis of the corresponding-point information from corresponding-point searching section 14 and the registered-image information from registered-image database 17. Reference-image determining section 16 repeats the voting process for every corresponding point searched for every characteristic point in the input image (reference image). Then, reference-image determining section 16 determines the registered image that has received the most votes as the reference image for the input image.

Reference-image determining section 16 preferably casts a vote weighted in accordance with the distance between characteristic values calculated by corresponding-point searching section 14. In this way, the results of the voting will contain the certainty of the corresponding points, and thus, a more appropriate reference image is selected as the reference image.

As illustrated in FIG. 4, each record stored in registered-image database 17 contains a registered image ID, a characteristic point ID detected from the registered image, the coordinate of the characteristic point, and the characteristic value of the characteristic point. For each registered image, registered-image database 17 holds multiple records corresponding to the respective characteristic points detected in the registered image.

Figure 5:
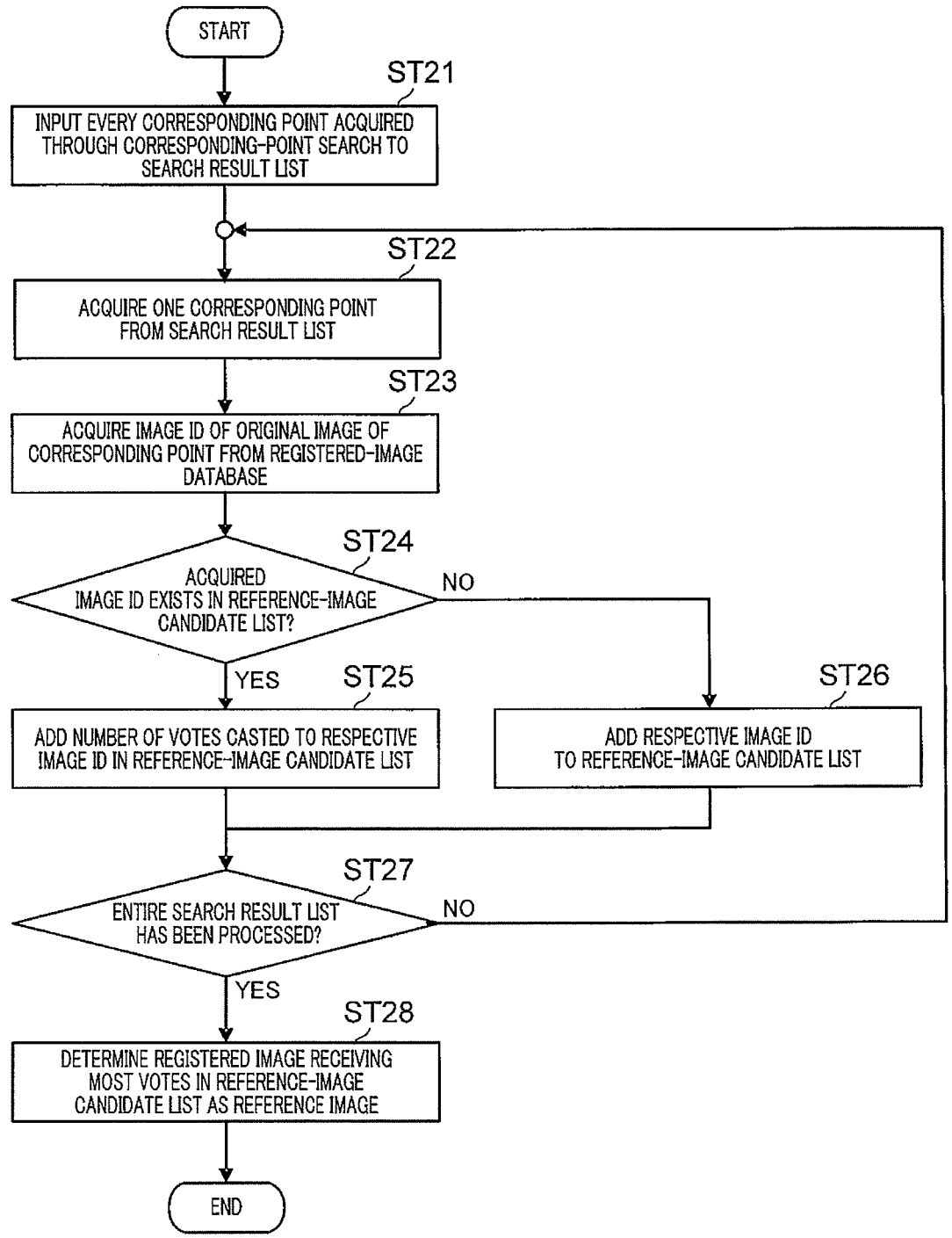
FIG. 5 is a flow chart of the procedures carried out by a reference-image determining section.

FIG. 5 illustrates the procedures carried out by reference-image determining section 16. In Step ST21, reference-image determining section 16 inputs every corresponding point acquired through the search of corresponding points to a search result list. The search result list contains the characteristic point IDs of the corresponding points and the distances between characteristic values of the characteristic points in the input image and the corresponding points. Step ST22 acquires one of the corresponding points from the search result list. Step ST23 acquires the image ID of the original image for the corresponding point from registered-image database 17.

Subsequent Step ST24 determines whether the acquired image ID is contained in a reference-image candidate list. The reference-image candidate list contains image IDs of the registered images and the number of votes. In other words, the list contains the number of votes for each registered image. If the result is positive in Step ST24 (YES in Step ST24), the process goes to Step ST25 to accumulate the number of votes for the corresponding image ID in the reference-image candidate list. In contrast, if the result is negative in Step ST24 (NO in Step ST24), the process goes to Step ST26 to add the corresponding image ID to the reference-image candidate list.

Step ST27 determines whether processing of every characteristic point in the search result list has been carried out. If the result is positive in Step ST 27 (YES in Step ST27), the process goes to Step ST28 to set the registered image that has received the most votes in the reference-image candidate list as the reference image. In contrast, if the result is negative in Step ST27 (NO in Step ST27), the process returns to Step ST22.

Characteristic-point selecting section 18 for geometric-transformation-parameter calculation selects reference characteristic points to be used by geometric-transformation-parameter calculating section 19. Specifically, characteristic-point selecting section 18 for geometric-transformation-parameter calculation selects a certain number of characteristic points in the input image detected by characteristic-point detecting section 11 in an ascending order from the characteristic point having the smallest distance of characteristic value to a characteristic point in the reference image searched by corresponding-point searching section 14. Characteristic points that are closer to the characteristic points already selected than a predetermined distance in the coordinate space are not selected.

In other words, characteristic-point selecting section 18 for geometric-transformation-parameter calculation selects characteristic points in the input image that have similarities greater than or equal to a predetermined value in comparison with the characteristic points in the reference image. As a result, the accuracy of the correspondence between the input image and the reference image can be enhanced. Characteristic-point selecting section 18 for geometric-transformation-parameter calculation selects characteristic points at which a distance in the coordinate space between the characteristic points in the input image and the characteristic points in the reference image is greater than or equal to a predetermined value. This can enhance the accuracy of geometric transformation.

Geometric-transformation-parameter calculating section 19 calculates geometric transformation parameters that represent geometric changes between the input image and the reference image. The geometric transformation described in this embodiment is affine transformation. Geometric-transformation-parameter calculating section 19 acquires multiple pairs of reference points, each pair consisting of a characteristic point in the input image and a corresponding characteristic point in the reference image, and calculates affine transformation parameters through the method of least squares. The pairs of reference points are the characteristic points selected by characteristic-point selecting section 18 for geometric-transformation-parameter calculation. The characteristic points in the input image that do not have corresponding characteristic points in the reference image are not included in the pairs of reference points. Affine transformation parameters can be determined through the method of least squares if at least three pairs of reference points are acquired. Inverse affine transformation is further carried out. Inverse affine transformation is geometric transformation from the reference image to the input image.

The affine transformation is represented by the following expressions:

$$x'=ax+by+c$$

and $$y'=dx+ey+f \quad \text{(expression 1)}$$

where (x,y) is the coordinates of a characteristic point in the input image (captured image), and (x',y') is the coordinates of a characteristic point in the reference image.

Characteristic-point selecting section 20 for similarity calculation selects characteristic points in the input image and the reference image to be used by similarity calculating section 21. Specifically, characteristic-point selecting section 20 for similarity calculation does not select such characteristic points in the input image that a distance between characteristic values of the characteristic points in the input image and the characteristic points in the reference image determined through the search of corresponding points is larger than a predetermined threshold. In other words, only characteristic points in the input image that have a distance smaller than or equal to the predetermined threshold between the characteristic values of the characteristic points in the input image and the characteristic points in the reference image determined through the search of corresponding points are selected as characteristic points to be used by similarity calculating section 21. Characteristic-point selecting section 20 for similarity calculation does not select characteristic points that are closer to the characteristic points already selected than a predetermined distance in the coordinate space. In this way, characteristic points in regions in an image that clearly have not varied and characteristic points that are disposed unnecessarily close to each other in the coordinate space can be excluded, avoiding excess similarity calculation.

Similarity calculating section 21 calculates the distance between the characteristic values of corresponding characteristic points in the input image and the reference image to determine the similarity. Specifically, similarity calculating section 21 first performs affine transformation of the characteristic points in the input image with the transformation parameters calculated by geometric-transformation-parameter calculating section 19. Then, similarity calculating section 21 searches for characteristic points in the reference image that are disposed near the coordinates of the affine-transformed characteristic points in the input image and then, calculates the distances between characteristic values of the characteristic points. Inversely, similarity calculating section 21 searches for characteristic points in the input image that are disposed near the coordinates determined through inverse transformation of the characteristic points in the reference image and then, similarly, calculates the distances between characteristic values of the characteristic points.

Similarity calculating section 21 prepares a corresponding-point list containing coordinates of the characteristic points in the input image and the distances of the characteristic values between the characteristic points in the input image and the corresponding characteristic points in the reference image. If there are no characteristic points in the input image corresponding to the characteristic points in the reference image, the coordinate points calculated through affine transformation of the reference image are input to the corresponding-point list as coordinates of the characteristic points in the input image. If there are no characteristic points in the input image or reference image corresponding to the characteristic points in the reference image or input image, the distances between the characteristic values are set as a sufficiently large value (i.e., have low similarity).

Figure 6A:
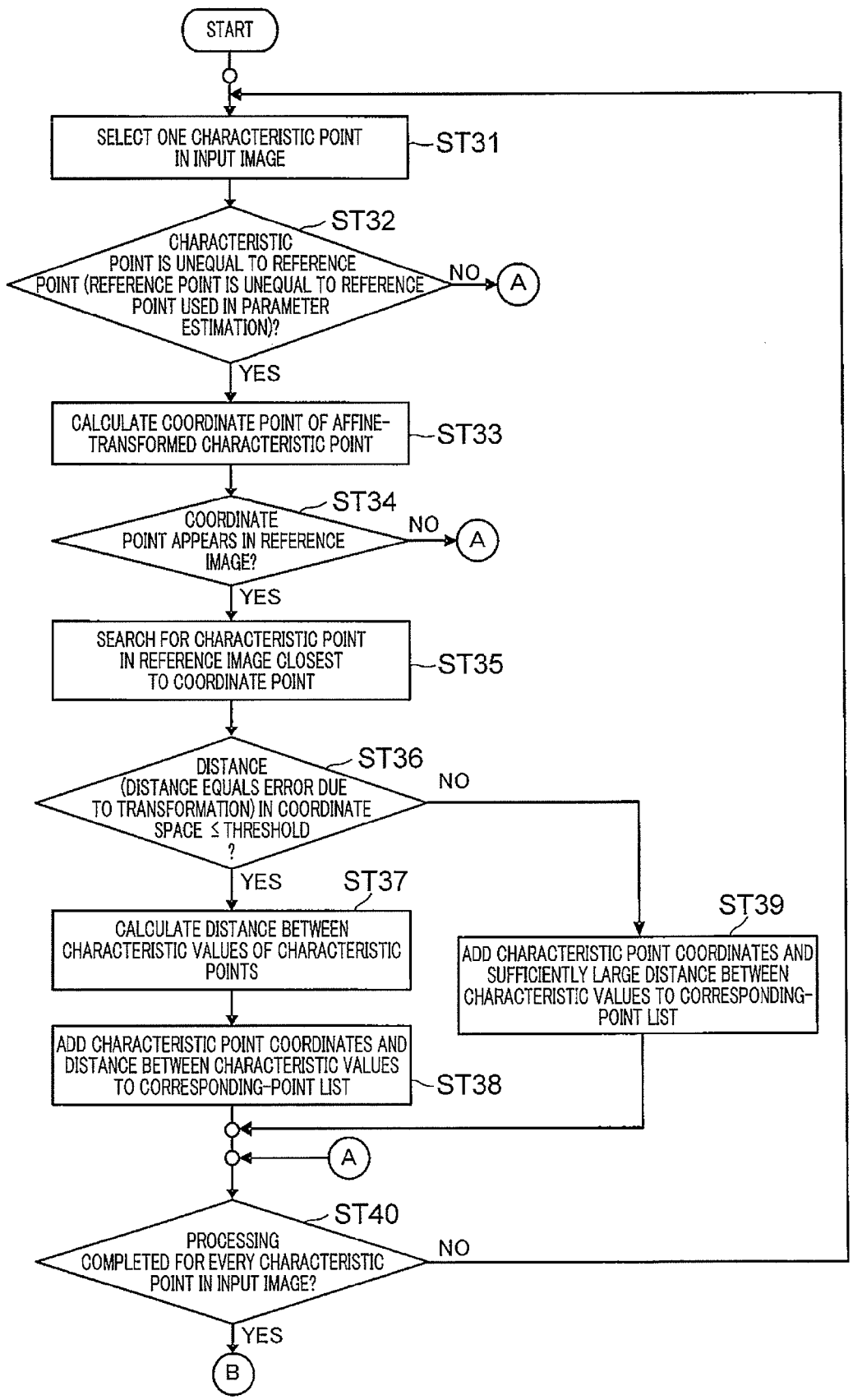
FIG. 6A is a flow chart of the procedures carried out by a similarity calculating section.
Figure 6B:
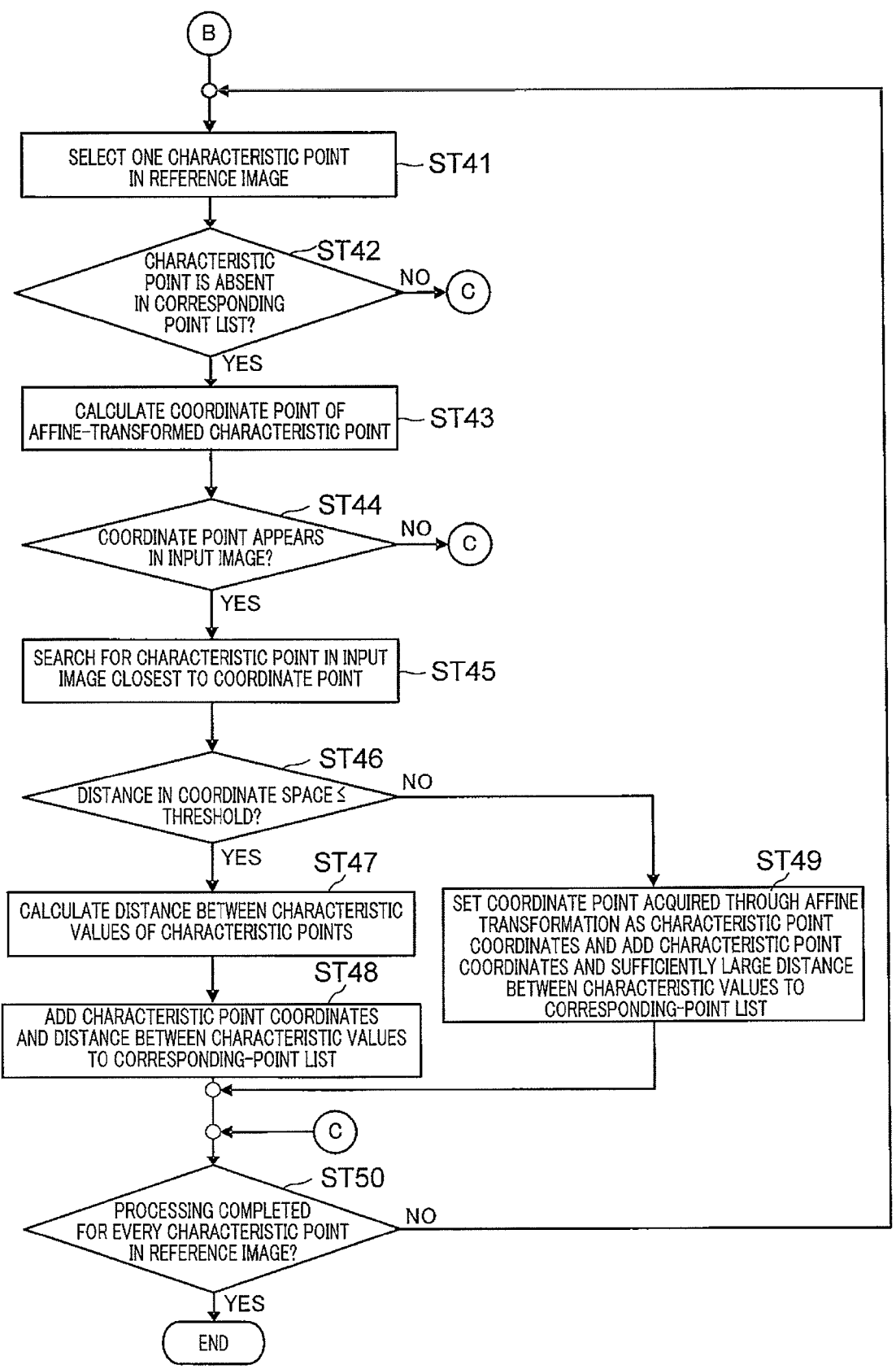
FIG. 6B is a flow chart of the procedures carried out by the similarity calculating section.

FIGS. 6A and 6B illustrate the procedures carried out by similarity calculating section 21. In Step ST31, similarity calculating section 21 selects one characteristic point in the input image. Subsequent Step ST32 determines whether the characteristic point is unequal to a reference point. This reference point refers to the reference point used in the parameter calculation by geometric-transformation-parameter calculating section 19. If similarity calculating section 21 determines that the characteristic point is unequal to a reference point (YES in Step ST 32), the process goes to Step ST33. Alternatively, if similarity calculating section 21 determines that the characteristic point is equal to a reference point (NO in Step ST32), the process goes to Step ST40.

Step ST33 calculates the coordinates of the affine-transformed characteristic point. Subsequent Step ST34 determines whether the coordinate point acquired through affine transformation appears in the reference image. If similarity calculating section 21 determines that the coordinate point acquired through affine transformation appears in the reference image (YES in Step ST34), the process goes to Step ST35. Alternatively, if similarity calculating section 21 determines that the coordinate point acquired through affine transformation does not appear in the reference image (NO in Step ST34), the process goes to Step ST40.

Step ST35 searches for a characteristic point in the reference image closest to the coordinate point acquired through affine transformation. Subsequent Step ST36 determines whether the distance in the coordinate space between the coordinate of the characteristic point in the reference image searched for in Step ST35 and the coordinate point acquired through affine transformation is smaller than or equal to a threshold. The threshold takes account of the error in the affine transformation. That means, if the result is positive in Step ST36 (YES in Step ST36), a characteristic point in the registered image corresponding to the affine-transformed characteristic point in the input image appears, and then, the process goes to Step ST37. In contrast, if the result is negative in Step ST36 (NO in Step ST36), a characteristic point in the registered image corresponding to the affine-transformed characteristic point in the input image does not appear even in consideration of the error in the affine transformation, and then, the process goes to Step ST39.

Step ST37 calculates the distance between characteristic values of the affine-transformed characteristic point in the input image and the corresponding characteristic point in the reference image. Then, Step ST38 adds the coordinates of the characteristic points and the distance between the characteristic values to the corresponding-point list.

Step ST39 adds the coordinates of the characteristic points and a sufficiently large distance between characteristic values to the corresponding-point list. The "sufficiently large distance between characteristic values" represents a value that can be identified as a varied region by Subsequent varied-region identifying section 22. A large distance between characteristic values indicates low similarity.

Subsequent Step ST40 determines whether the processing for all characteristic points in the input image has been completed. If completed (YES in Step ST40), the process goes to Step ST41. If not completed (NO in Step ST40), the process returns to Step ST31 to repeat the same process for the next characteristic point.

The processes of Steps ST31 to ST40 detects an item (i.e., varied region) that does not appear in the registered image but appears in the captured image, such as an item that has been left behind. Specifically, Step ST39 sets a distance between characteristic values in such a varied region, the distance being large enough to be identified as a varied region by subsequent varied-region identifying section 22.

In contrast, the processes of Steps ST41 to ST50, which will be described below, detects an item (i.e., varied region) that appear in the registered image but does not appear in the captured image, such as an item that has been taken away.

In Step ST41, similarity calculating section 21 selects one characteristic point in the reference image. Subsequent Step ST42 determines whether the characteristic point selected in Step ST41 is absent in the corresponding-point list. If similarity calculating section 21 determines that the characteristic point is absent in the corresponding-point list (YES in Step ST42), the process goes to Step ST43. Alternatively, if similarity calculating section 21 determines that the characteristic point is present in the corresponding-point list (NO in Step ST42), the process goes to Step ST50.

Step ST43 calculates the coordinate point of the affine-transformed characteristic point. Subsequent Step ST44 determines whether the coordinate point acquired through affine transformation appears in the input image. If similarity calculating section 21 determines that the coordinate point acquired through affine transformation appears in the input image (YES in Step ST44), the process goes to Step ST45. Alternatively, if similarity calculating section 21 determines that the coordinate point acquired through affine transformation does not appear in the input image (NO in Step ST44), the process goes to Step ST50.

Step ST45 searches for a characteristic point in the input image closest to the coordinate point acquired through affine transformation. Subsequent Step ST46 determines whether the distance in the coordinate space between the coordinates of the characteristic point in the input image searched for in Step ST45 and the coordinate point acquired through affine transformation is smaller than or equal to a threshold. The threshold takes account of the error in the affine transformation. That means, if the result is positive in Step ST46 (YES in Step ST46), a characteristic point in the input image corresponding to the affine-transformed characteristic point in the reference image appears, and then, the process goes to Step ST47. In contrast, if the result is negative in Step ST46 (NO in Step ST46), a characteristic point in the input image corresponding to the affine-transformed characteristic point in the reference image does not appear even in consideration of the error in the affine transformation, and then, the process goes to Step ST49.

Step ST47 calculates the distance between characteristic values of the affine-transformed characteristic point in the reference image and the corresponding characteristic point in the input image. Then, Step ST48 adds the coordinates of the characteristic points and the distance between the characteristic values to the corresponding-point list.

Step ST49 sets the coordinate point acquired through affine transformation as the coordinates of the characteristic point and adds the coordinates of the characteristic points and a sufficiently large distance between characteristic values to the corresponding-point list. The "sufficiently large distance between characteristic values" represents a value that can be identified as a varied region by subsequent varied-region identifying section 22.

Subsequent Step ST50 determines whether the processing for all characteristic points in the reference image has been completed. If not completed (NO in Step ST50), the process returns to Step ST41 to repeat the same process for the next characteristic point.

In this way, similarity calculating section 21 prepares a corresponding-point list. If any corresponding characteristic point exists between the input image and the reference image, a relatively small distance between characteristic values will be written in the corresponding-point list. In contrast, if no corresponding characteristic point exists between the input image and the reference image, a sufficiently large distance between characteristic values will be written in the corresponding-point list. A small distance between characteristic values indicates high similarity.

On the basis of the corresponding-point list prepared by similarity calculating section 21, varied-region identifying section 22 identifies a local region of aggregated characteristic points with large distances between characteristic values (i.e., low similarity) as a varied region. Specifically, varied-region identifying section 22 divides the input image into squares and casts a vote to each square that contains a characteristic point at which a distance between characteristic values calculated by similarity calculating section 21 is larger than or equal to a threshold. Similarity calculating section 21 repeats the voting process for all characteristic points and then identifies each square that received a number of votes larger than or equal to a threshold as a varied region.

In this case, a varied region is identified by dividing the input image into squares and casting votes to each square, but the varied region may otherwise be detected by, for example, detecting a region of aggregated characteristic points at which distances between characteristic values are larger than or equal to a threshold.

FIG. 7 shows images of the varied-region detection performed by varied-region detecting apparatus 10 according to this embodiment.

Figures 1, 7A:
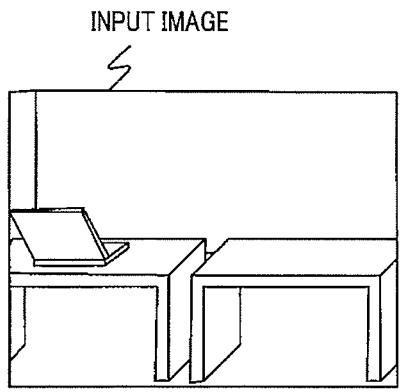
Figures 1, 7B:
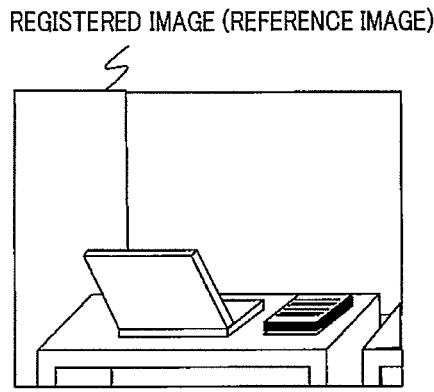
Figures 2, 7A:
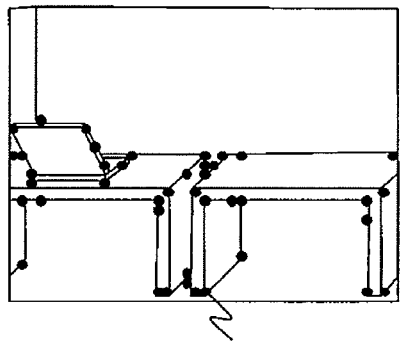
FIG. 7 illustrates images of varied-region detection carried out by the varied-region detecting apparatus.
Figures 2, 7B:
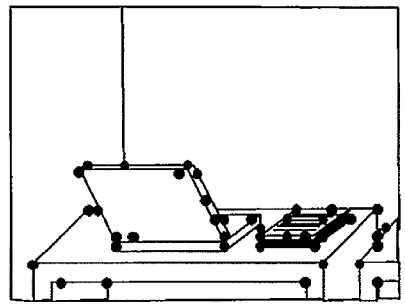
Figures 3, 7B:
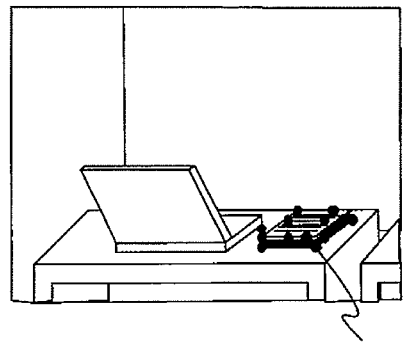
Figures 3, 7A:
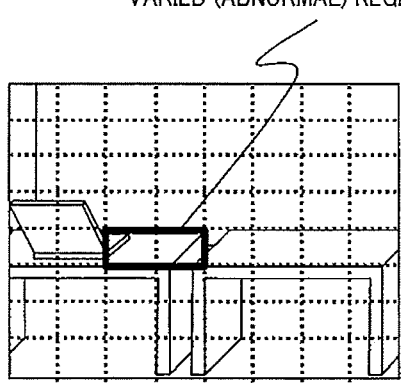

FIG. 7A-1 illustrates an input image (captured image), and FIG. 7B-1 illustrates a reference image. FIG. 7A-2 illustrates characteristic points in the input image, and FIG. 7B-2 illustrates characteristic points in the reference image. FIG. 7B-3 illustrates the case where characteristic points with large distances between characteristic values appear in the reference image (that is, characteristic points that do not appear in the input image appear in the reference image). In such a case, varied-region identifying section 22 identifies the region defined by the thick frame in FIG. 7A-3 as a varied (abnormal) region. That is, in the illustrated case, the document has been taken away.

As described above, this embodiment includes characteristic-point selecting section 13 for corresponding-point search that selects characteristic points to be used for determination of a reference image from characteristic points in an input image (captured image); characteristic-point selecting section 18 for geometric-transformation-parameter calculation that selects characteristic points to be used for calculation of geometric transformation parameters from the characteristic points in the input image and the reference image; and characteristic-point selecting section 20 for similarity calculation that selects characteristic points to be used for determination of the similarity between the captured image and the reference image from the characteristic points in the input image and the reference image. Thereby, characteristic-point selecting sections 13, 18, and 20 respectively and independently select characteristic points suitable for determination of reference image, characteristic points suitable for calculation of geometric transformation parameters, and characteristic points suitable for calculation of similarity. This enables the determination of an appropriate reference image, appropriate geometric transformation parameters, and accurate similarity, without excess calculation. As a result, a varied region can be accurately determined with a reduced calculation load.

The entire content disclosed in the descriptions, drawings, and abstract of Japanese Patent Application No. 2010-172379, filed on Jul. 30, 2010, is hereby incorporated by reference.

INDUSTRIAL APPLICABILITY

An apparatus and a method of detecting a varied region according to the present invention is suitable for, for example, a monitoring system that includes a wearable camera.

REFERENCE SIGNS LIST 10 varied-region detecting apparatus
11 characteristic-point detecting section
12 characteristic-value calculating section
13 characteristic-point selecting section for corresponding-point search
14 corresponding-point searching section
15 characteristic-value index section
16 reference-image determining section
17 registered-image database
18 characteristic-point selecting section for geometric-transformation-parameter calculation
19 geometric-transformation-parameter calculating section
20 characteristic-point selecting section for similarity calculation
21 similarity calculating section
22 varied-region identifying section

The invention claimed is:

1. A method of detecting a varied region comprising:
receiving, by a processor, a captured image captured by an imaging device;
selecting, by a processor, first characteristic points to be used for calculation of a geometric transformation parameter, from characteristic points in the captured image and characteristic points in a reference image;
calculating, by a processor, the geometric transformation parameter based on the selected first characteristic points;
selecting, by a processor, second characteristic points to be used for determination of a similarity between the captured image and the reference image, from the characteristic points in the captured image and the characteristic points in the reference image;
performing, by a processor, geometric transformation on the selected second characteristic points based on the calculated geometric transformation parameter;
calculating, by a processor, the similarity between the second characteristic points in the captured image and the second characteristic points in the reference image, after the geometric transformation;
identifying, by a processor, a varied region based on the determined similarity,
wherein
the performing the geometric transformation performs the geometric transformation on the second characteristic points in the captured image to obtain the transformed second characteristic points, searches for a closest characteristic point in the reference image, the closest characteristic point being closest to each of the transformed second characteristic points, calculates a distance between each transformed second characteristic point and the closest characteristic point corresponding to the transformed second characteristic point, and compares the calculated distance with a predetermined threshold, and
the identifying the varied region divides the captured image into a plurality of local regions, calculates a number of the second characteristic points having the distance larger than the predetermined threshold in each local region, and identifies a local region in which the calculated number of the second characteristic points is larger than a predetermined number, as the varied region.

2. A varied-region detecting apparatus comprising
a processor, executing instructions stored in a memory,
a first characteristic-point selector that selects first characteristic points to be used for calculation of a geometric transformation parameter, from characteristic points in an image captured by an imaging device and characteristic points in a reference image;
a geometric-transformation-parameter calculator that calculates the geometric transformation parameter based on the selected first characteristic points;
a second characteristic-point selector that selects second characteristic points to be used for determination of a similarity between the captured image and the reference image, from the characteristic points in the captured image and the characteristic points in the reference image;
a similarity calculator that performs geometric transformation on the selected second characteristic points based on the calculated geometric transformation parameter, and calculates the similarity between the second characteristic points in the captured image and the second characteristic points in the reference image, after the geometric transformation; and
a varied-region identifier, that identifies a varied region based upon the similarity determined by the similarity calculator; the similarity calculator performs the geometric transformation on the second characteristic points in the captured image to obtain the transformed second characteristic points, searches for a closest characteristic point in the reference image, the closest characteristic point being closest to each of the transformed second characteristic points, calculates a distance between each transformed second characteristic point and the closest characteristic point corresponding to the transformed second characteristic point, and compares the calculated distance with a predetermined threshold, and the varied region identifier divides the captured image into a plurality of local regions, calculates a number of the second characteristic points having the distance larger than the predetermined threshold in each local region, and identifies a local region in which the calculated number of the second characteristic points is larger than a predetermined number, as the varied region.

3. The varied-region detecting apparatus according to claim 2, further comprising:
a registered-image database that stores a plurality of registered images,
wherein the processor, executing the instructions, further comprises:
a characteristic-point detector that detects the characteristic points in the captured image;

a third characteristic-point selector that selects third characteristic points to be used for determination of the reference image from the characteristic points in the captured image; and a reference-image determiner that matches the captured image with each registered image of the plurality of registered images based on the selected third characteristic points and characteristic points in the plurality of registered images stored in the registered-image database, and determines one of the registered images having a highest matching with the captured image as the reference image among the plurality of registered images.

4. The varied-region detecting apparatus according to claim 3, wherein the selected third characteristic points are sparser than the selected second characteristic points.

* * * * *